Jan. 5, 1943.  D. C. BETTISON  2,307,446

RAIL FISSURE DETECTOR

Filed April 6, 1940

INVENTOR
David C. Bettison
BY
HIS ATTORNEY

Patented Jan. 5, 1943

2,307,446

UNITED STATES PATENT OFFICE 2,307,446

RAIL FISSURE DETECTOR

David C. Bettison, Omaha, Nebr.

Application April 6, 1940, Serial No. 328,355

5 Claims. (Cl. 175—183)

My invention relates to means for automatically detecting flaws and fissures in metallic bars, and more specifically to means for detecting flaws and fissures in railway rails.

One object of my invention is to provide a highly sensitive yet rugged detector which is capable of detecting rail fissures of relatively small magnitude. Another object is to provide a detector of comparatively simple design and having no moving parts relative to the mounting or detector car on which the detector is carried. Other objects and advantages will become apparent as the description progresses.

In my invention, these objects are accomplished by providing a simple receiver core and coil assembly with pick-up pole pieces so disposed with respect to the rail that the flux set up by testing current which flows in the rail does not link the receiver coil except when such flux is distorted due to the presence of a rail fissure. These objects are further accomplished by connecting two or more receivers together so that they cooperate in providing rail flaw detection.

I shall describe two forms of apparatus embodying my invention and shall then point out the novel features thereof in claims.

The present invention is an improvement on the invention disclosed in Letters Patent of the United States No. 1,892,826 granted on January 3, 1933, to David C. Bettison and Frank H. Keaton.

Figure 1:
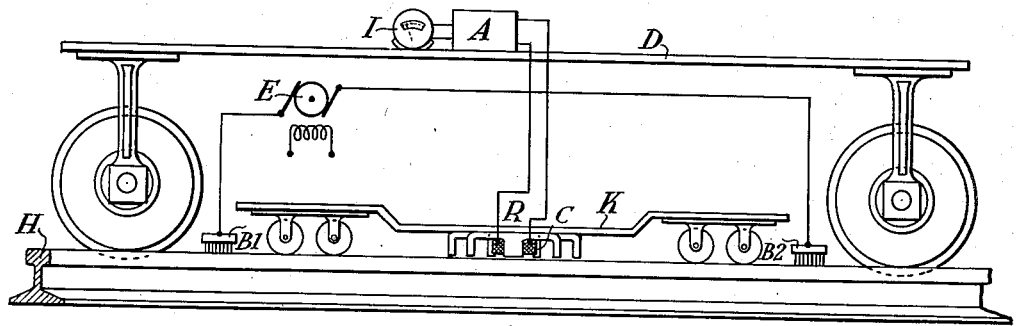
Figures 2, 2A:
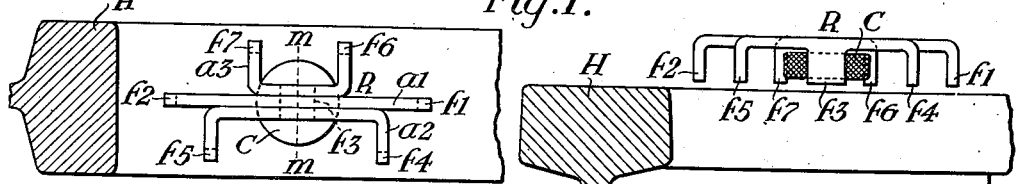
Figures 2B, 3:
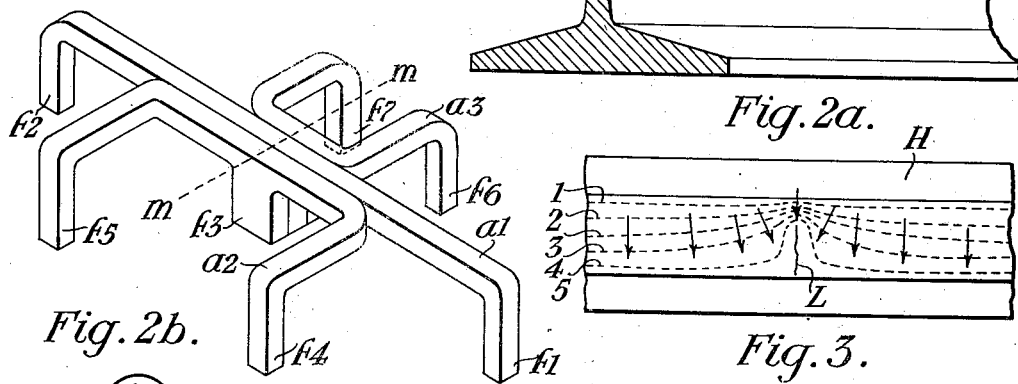
Figure 4:
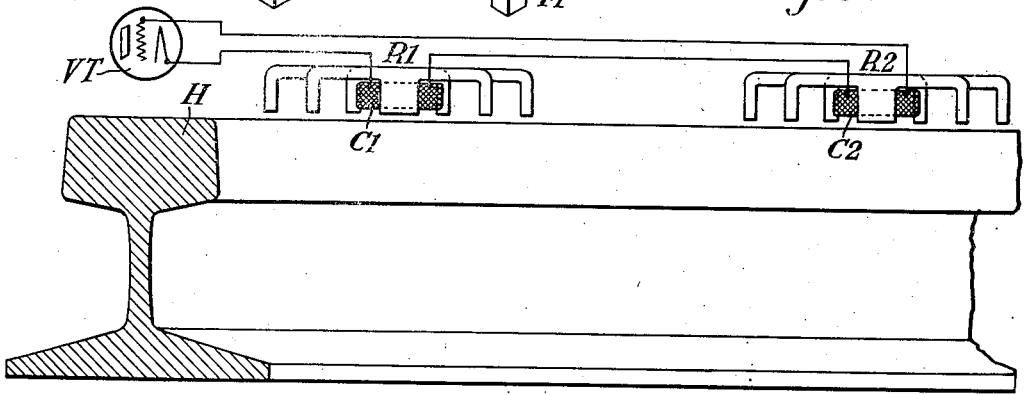

In the accompanying drawing, Fig. 1 is a diagrammatic view showing the general features of a test car equipped with the apparatus embodying my invention. Figs. 2 and 2a are diagrammatic views showing an enlarged plan view and elevation, respectively, of the receiver portion of the apparatus embodying my invention, in association with a portion of rail to be tested. Fig. 2b is a perspective view of the receiver core structure. Fig. 3 is a view looking downwardly on the top of a rail, in which the current distribution around a fissure in the head of the rail is shown. Fig. 4 is a diagrammatic view similar to Fig. 2a showing two receivers connected in series.

Similar reference characters refer to similar parts in each of the several views.

Referring to Fig. 1, the reference character D designates a test car arranged to travel upon the rails H of a railroad and propelled by any suitable means such as an internal combustion engine, not shown in the drawing. The test car is equipped with a carriage K to which is affixed the receiver R with its poles in close proximity to the rail surface. The test car also carries a generator E capable of producing a heavy direct or alternating current which is introduced into a section of the rail H by brushes B1 and B2. The portion of the carriage K which supports the receiver is preferably made of non-magnetizable material so as not to distort the rail flux in the vicinity of the receiver and so as to confine the pick-up flux to the receiver itself.

Mounted on the core of receiver R is a pick-up coil C which normally does not link any flux as the test car passes over the rail to be tested but which, in the presence of a rail fissure, picks up rail flux in a manner to be described hereinafter, thus causing a tell-tale voltage to be induced in the coil. The resulting voltage may be amplified in any suitable and well-known manner through an amplifier such as illustrated diagrammatically by the rectangle A in Fig. 1, or the vacuum tube VT of Fig. 4. The output of the amplifier may be used to operate any suitable indicating or recording device, such as the indicator I of Fig. 1.

Horizontal motion of the test car along the rails is transmitted to the carriage K by a suitable mechanical connection which is not shown in the drawing but which should be of such character as to minimize the transmission of vertical and lateral motion of the car D to the carriage K. This is desirable as it is important to maintain the receiver R in a substantially constant position with respect to the rail except, of course, for the forward motion of the receiver along the rail. Suitable provision should also be made for raising the carriage away from the rails at such times as tests are not being made in order to eliminate unnecessary jarring and wear on the test equipment when the test car is being rapidly driven to or from the operating location.

The generator E may be used to supply current to more than one track rail, if desired, and a second receiver may be mounted upon an independent carriage cooperating with the second track rail, so that both rails may be tested during a single run of the test car. Either the same amplifier A or preferably, a separate amplifier and indicator may be used when two-rail tests are being conducted.

Having so far described the general features of the test car, I shall next describe the construction of the receiver R itself. This construction can best be seen from the diagrams of Figs. 2, 2a, and 2b. Looking first at Fig. 2b, it will be seen from this figure that the receiver core comprises three portions $a1$, $a2$, and $a3$ suitably fastened together by means not shown and forming a spider-like assembly in which the various feet $f1$ to $f7$, inclusive, serve to pick up some of the flux set up by the testing current from generator E which flows in the rail to be tested. Core portion $a1$ is a T-shaped member having two end feet $f1$ and $f2$ and a central foot $f3$. The central foot has approximately twice the cross sectional area of each of the two end feet. The core portion $a2$ is also a T-shaped member, the two arms of which have been bent substantially at right angles to the body portion so that the structure resembles a U when viewed from above. This core portion has end feet $f4$ and $f5$, as well as a central foot $f3$ which registers with the other central foot $f3$ of core portion $a1$. Portion $a3$ of the receiver core is similar in shape to portion $a2$ but the width of the U formed by the pick-up arms is preferably much smaller. The reasons for positioning the various core feet of the pick-up "spider" in the particular relationship shown in Figs. 2, 2a and 2b will become clear as the description progresses.

The core portions $a1$, $a2$, and $a3$ are preferably made of low-loss transformer steel and may be suitably laminated for greater efficiency. Obviously, making the "spider" of three or more parts rather than one is merely to simplify construction since the structure could as well be formed or machined from one piece of material, if desired. All of the end feet except the central or return foot $f3$ have been shown as having approximately the same pick-up area, this being also the same as the sectional area of the arm portions of each core member. These areas are not critical either in relative or absolute dimensions. Also, the feet can be either of larger or smaller section than the member to which they belong. For maximum effectiveness, the core structure should preferably have substantial symmetry on either side of a vertical plane passing through the bisecting line $m$—$m$ in Figs. 2 and 2b, although this requirement is not essential for operativeness. When constructed in this symmetrical manner, as much flux will thread the entering portion of the core as will thread the leaving portion during passage of the receiver over a fissure, thus strongly accentuating the induced voltage. Since the foot $f3$ carries the whole of the return flux, its sectional area should preferably be approximately equal to the sum of the areas of the remaining six feet, and it has been so illustrated.

Referring particularly to Figs. 2 and 2a, it will be seen that the receiver coil C is mounted on the central or return foot $f3$ of the receiver core so that it will be threaded by the distorted flux passing between the return foot and any one or more of the remaining six feet but will not be affected to any appreciable extent by the uniform flux effective when no fissure is present. This uniform flux will be by-passed around the coil through the main body of the receiver but will not pass through the foot $f3$ on which the coil is located. Assuming the rail H to be of standard size, the various dimensions of the receiver are approximately in the proportion indicated in Figs. 2 and 2a. In general, the core member $a1$ serves to improve the detection of central rail fissures or flaws, whereas the core members $a2$ and $a3$ serve mainly to detect off-center fissures. It will be understood, however, that all three core members cooperate and contribute their effect in detecting the various fissures since in most cases the distorted flux due to a fissure will not be highly localized, but will embrace the poles of more than one core member.

The rail current which I have found satisfactory for providing reliable flaw detection by means of my apparatus may be of the order of 2000 amperes. The clearance between the receiver feet and the top rail surface should preferably be about one-quarter inch but this clearance is not highly critical. Obviously, the smaller the clearance, the more sensitive the detection will be but mechanical reasons make it difficult to place the receiver much closer than one-quarter inch above the rail, in practice.

Reference to Fig. 3 will show how, in a simple case, a rail fissure L in the head of a rail deflects the rail current so that a distorted field is produced in the space immediately above the rail surface which is traversed by the receiver as the test car moves along the rail. The flow of rail current around the fissure is indicated by the broken lines 1, 2, 3, 4, and 5 and it will be apparent that the field produced by this current will not be symmetrical about the longitudinal rail axis but will be distorted to a greater or lesser extent, as indicated by the arrows, depending on the location and magnitude of the fissure. Accordingly, the flux will not pass symmetrically into feet $f6$ and $f7$ and out of feet $f4$ and $f5$, for example, but some net flux will pass through the foot $f3$ and will link coil C, as the receiver passes over the fissure. As a result, a voltage will be induced in the coil due to cutting of the lines of the distorted flux by the moving coil and this voltage may be used to provide the necessary indication of the flaw. If this voltage is insufficient, it may be suitably amplified to operate an indicator or other apparatus such as a recorder or a rail marker.

Looking at the operation of the receiver from another viewpoint, it may be considered that with the apparatus positioned symmetrically with respect to the rail, as shown in Figs. 2 and 2a, the central foot $f3$ which extends through the coil is, under normal conditions, at the same magnetic potential or is magnetically balanced with reference to all of the remaining six feet on the receiver structure. Should the magnetic potential of any one of the seven feet be increased or decreased due, for example, to magnetic distortion at a fissure, then a certain amount of flux will link coil C or a change in the number of flux lines linking the coil will take place as the receiver moves along the rail so that a voltage will be induced in the coil.

It will be apparent from the above that the receiver should preferably be so designed and proportioned that when passing over a rail which is sound, no appreciable net flux will pass through the central foot $f3$ so that no voltage will be induced in the coil when the receiver moves through a uniform field, unless a fissure is present to distort the field. In this respect, the apparatus embodying my invention differs from other known apparatus in which an indication results from a change in the voltage level resulting from a change in the flux direction caused by a fissure, but in which the usual or balanced flux itself induces a voltage due either to a movement of the receiver through the field or to rotation of the coil within the receiver structure.

Referring again to Fig. 2, it will be observed that the receiver core is not symmetrical with the longitudinal axis of the rail in that the feet $f6$ and $f7$ of core member $a3$ are substantially closer to the center of the receiver coil than are the corresponding feet $f4$ and $f5$ of core member $a2$. I have found upon test that although a core which is symmetrical with respect to the rail center line is quite satisfactory for detecting off-center fissures, such a core will not necessarily detect center of rail fissures or those fissures which may lie in a vertical plane through the center of the rail head. The reason for this behavior is that such fissures frequently result in a symmetrical increase as well as decrease of the flux concentration to each side of the longitudinal rail center line so that as the coil passes over and away from the fissure, any flux passing through the coil due to core a3 is substantially neutralized by the flux due to core a2. In other words, the distorted flux due to a center fissure ordinarily does not have a net or resultant longitudinal component parallel to the rail length such as could be picked up by a symmetrically designed core. Actually, of course, the testing current will divide in passing around a center fissure and the two currents will set up distorted fields, each of which will have a longitudinal component, but since these components are opposite in direction, their net resultant will frequently be zero along the rail axis. Accordingly, dissymmetry along a line at right angles to the rail length should be introduced into the pick-up structure in order that one of these distorted flux components will not only be more effective in linking the receiver coil, but the induction will take place at a slightly different time from that which is due to the opposing flux component, because of the fact that the foot f4 is located in advance of the foot f6, assuming motion of the test car from left to right.

I have found by means of extensive tests that a receiver having six collecting feet and one return foot disposed in the manner shown in Fig. 2 will satisfactorily detect both center and off-center fissures of the type commonly found in defective rails. It is apparent, however, that my invention is not limited to a receiver structure having this particular number of feet or having a single coil mounted on the central or return foot. Obviousy, the number of core portions as well as the number of feet can be reduced or increased and the dissymmetry of the core portions a2 and a3 can likewise be reduced, or increased, depending upon the desired sensitivity for certain types of fissures or flaws. I have found, for example, that the core portion a1 can be dispensed with, but the detection is more sensitive and more reliable when member a1 is present. Additional core members, either straight as a1, or U-shaped as a2 or a3 but differing in dimensions therefrom, can also be used. The coil can also be placed on any suitable part of the core other than the foot f3, provided that it is linked by the distorted flux and is substantially unaffected by the uniform flux, and can also be divided into two or more parts placed on different arms or feet of the receiver core, as desired. In general, the coil should be centrally placed with respect to the top of the rail and should have its axis substantially vertical with respect to the rail surface. It should also be placed as close to the rail as practicable in order that its pick-up function will be most effective.

It will be apparent that symmetry of the core structure on the two sides of the line m—m in Fig. 2 is not essential for operativeness though it may, for practical purposes, be desirable. As a matter of fact, the apparatus will operate even though one-half of the core (to the right or to the left of the line m—m) is completely removed, but the added induction which is obtainable when the whole core is present, as shown, renders the apparatus much more sensitive.

Although I have set forth certain theoretical reasons as to why the apparatus operates to detect various rail fissures effectively, I wish to point out that this theory is not intended to be either rigorous or complete, my purpose being mainly to provide a simple explanation by means of which a more clear understanding of the structure embodying my invention can be obtained.

Referring to Fig. 4, I have shown in this figure how two receivers R1 and R2 can be combined to cooperate with one another for detecting flaws in a rail. The two receiver coils C1 and C2 are connected in series to the input terminals of a suitable amplifier VT. In this manner, an additional check is provided on the presence of a flaw at a particular location in the rail because, as the individual receivers pass progressively over the flaw, each will induce a voltage at the given location.

Although I have herein shown and described only two forms of apparatus embodying my invention, it is understood that various changes and modifications may be made therein within the scope of the appended claims without departing from the spirit and scope of my invention.

Having thus described my invention, what I claim is:

1. A receiver for detecting flaws in rails comprising a magnetizable core adapted to be moved along the rail surface in close proximity thereto and having a plurality of pole pieces at least one of which is approximately centrally located with respect to the top rail surface and the remaining pole pieces are equally distributed in number to one side and to the other side of said central pole piece and are located near to one and the other side of the rail respectively, and a pick-up coil on said receiver having its axis substantially perpendicular to said top rail surface and positioned on said central pole piece, whereby normally when no fissure is present said remaining pole pieces will by-pass the flux due to the testing current around said pick-up coil and whereby when a fissure is present the distorted flux due to said testing current will link said pick-up coil to thereby cause a voltage to be induced therein as the coil is moved over said fissure.

2. A receiver for detecting flaws in rails comprising a magnetizable core adapted to be moved along the rail surface in close proximity thereto and having a main pole piece approximately centrally located with respect to the top rail surface, a first auxiliary pole piece on said core located near to one side of said rail at a given distance from said main pole piece, a second auxiliary pole piece on said core located near to the other side of the rail at a distance from said main pole piece which differs from said given distance, and a pick-up coil on said receiver having its axis substantially perpendicular to said top rail surface and positioned on said main pole piece, whereby when a fissure is present the distorted flux due to the testing current will be picked up by said pole pieces to thereby cause a voltage to be induced in said coil as the receiver is moved over said fissure.

3. A receiver for detecting flaws in rails comprising a magnetizable core adapted to be moved along the rail surface in close proximity thereto and having a main pole piece approximately centrally located with respect to the top rail surface, a first auxiliary pole piece on said core located near to one side of said rail at a given distance from said main pole piece, a second auxiliary pole piece on said core located near to the other side of the rail at a distance from said main pole piece which differs from said given distance, a third auxiliary pole piece on said core located substantially along the rail center line, and a pick-up coil on said receiver having its axis substantially perpendicular to said top rail surface and positioned on said main pole piece, whereby when a fissure is present the distorted flux due to the testing current will be picked up by said pole pieces to thereby cause a voltage to be induced in said coil as the receiver is moved over said fissure.

4. A receiver for detecting flaws in rails comprising a magnetizable core adapted to be moved along the rail surface in close proximity thereto and having a main pole piece approximately centrally located with respect to the top rail surface, a first pair of pole pieces on said core located near to one side of said rail, the two pole pieces of said first pair being substantially equally displaced from a line passing through the center of said main pole piece at right angles to the rail length, a second pair of pole pieces on said core located near to the other side of said rail, the two pole pieces of said second pair being also substantially equally displaced from said line passing through said main pole piece, and a pick-up coil on said receiver having its axis substantially perpendicular to said top rail surface and positioned on said main pole piece, whereby a voltage will be induced in said coil by the distorted flux picked up by said pole pieces and due to the testing current as the receiver is moved over a fissure in said rail.

5. A receiver for detecting flaws in rails comprising a magnetizable core adapted to be moved along the rail surface in close proximity thereto and having a main pole piece approximately centrally located with respect to the top rail surface, a plurality of pole pieces on said core distributed over the rail surface on one side of a line passing through the center of said main pole piece at right angles to the rail length, a plurality of pole pieces on said core positioned on the other side of said line and distributed over the rail surface symmetrically with said aforementioned plurality, and a pick-up coil on said receiver having its axis substantially perpendicular to said top rail surface and positioned on said main pole piece, whereby a voltage will be induced in said coil by the distorted flux picked up by said pole pieces and due to the testing current as the receiver is moved over a fissure in said rail.

DAVID C. BETTISON.